United States Patent
Watanabe

[19]

[11] Patent Number: 6,163,926
[45] Date of Patent: Dec. 26, 2000

[54] SPLIT-PIN HINGE WITH WIRE EXTENDING THERETHROUGH

[75] Inventor: Genji Watanabe, Sabae, Japan

[73] Assignee: PPG Industries Ohio, Inc., Cleveland, Ohio

[21] Appl. No.: 09/438,213

[22] Filed: Nov. 12, 1999

[51] Int. Cl.[7] ...................................................... G02C 5/22
[52] U.S. Cl. ............................................. 16/228; 351/153
[58] Field of Search ................................ 351/140, 153, 351/41; 16/228, 229, 235, 243, 244

[56] References Cited

U.S. PATENT DOCUMENTS

| | | | |
|---|---|---|---|
| 4,618,226 | 10/1986 | Sartor et al. ............................ | 351/113 |
| 4,756,605 | 7/1988 | Okada et al. ........................ | 350/347 V |
| 4,978,209 | 12/1990 | Ohba ...................................... | 351/153 |
| 4,991,951 | 2/1991 | Mizuno et al. ............................ | 351/41 |
| 5,520,851 | 5/1996 | Yu et al. ................................. | 252/518 |
| 5,818,568 | 10/1998 | Onaga et al. ............................ | 351/153 |

*Primary Examiner*—Hung Xuan Dang
*Attorney, Agent, or Firm*—William C. Mitchell

[57] ABSTRACT

Hinge and one or more wires, or electrical conductors, wherein a segment of such wire or wires extends axially through at least one hollow pivot pin portion of a hinge and wherein such segment of the wire or wires is placed in torsion upon the hinge being pivoted.

11 Claims, 4 Drawing Sheets

SPLIT-PIN HINGE WITH WIRE EXTENDING THERETHROUGH

BACKGROUND OF THE DISCLOSURE

1. Field of the Invention

This invention relates generally to a hinge and a wire extending through the hinge and further relates to eyeglasses, such as electrooptic eyeglasses, including a hinge through which one or more, preferably a set, of conductors extend to connect electrical components such as an electrical circuit and power supply to an eyeglass lens, thereby causing the lens to change an optical characteristic such as, for example, color, opaqueness, transmisivity or other optical property.

2. Description of the Background Art

Eyeglasses typically include a frame in which a pair of eyeglass lenses are mounted, a pair of temples and a pair of hinges pivotally interconnecting the frame and the temples. Each hinge typically includes a tang extending outwardly from one end of the eyeglass frame, a clevis provided on one end of a temple and including a pair of spaced apart and generally parallel clevis members, and a pivot pin. The tang is provided with a pivot pin through hole and the clevis members are provided with a pair of axially aligned pivot pin through holes. The clevis members are placed around the tang, the through holes axially aligned and the connector pin is inserted into the aligned through holes to pivotally interconnect the tang and clevis. A "barrel type" eyeglass hinge is similar except it contains multiple tangs interleaved with clevises.

Eyeglasses are known in the art including electrooptical eyeglass lenses which are provided with or comprise an optical element which changes an optical characteristic, such as opaqueness, color, transmisivity, or other optical property, upon an electrical signal or electric charge being applied to the eyeglass lens. For example, U.S. Pat. No. 04,756,605, entitled LIQUID CRYSTAL SPECTACLES, patented Jul. 12, 1988, Okada et al. inventors, discloses spectacles having a pair of liquid crystal lenses, a frame, a pair of temples and a pair of hinges pivotally interconnecting the temples and the frame of the spectacles. A regulator circuit is provided in each temple and a regulator circuit is connected to the eyeglass lenses through a pair of conductors with the conductor extending through the brow of the spectacle frame and with the conductor extending through the rim of the spectacle frame. The conductors are connected to transparent electrodes and when voltage from the regulator circuit is applied to the electrodes, the liquid crystal molecules of the liquid crystal layers gradually change their direction of orientation toward (i.e., become perpendicular to) the transparent plate. Thus, the refractive indices of liquid crystal layers, with respect to incident light, can be changed in succession.

Other eyeglasses are known in the art which include electrochromic eyeglass lenses or wherein a transparent layer of electrochromic material is applied to the eyeglass lenses. Upon electrical charge being applied to such electrochromic lenses, the lenses change in transmittance property. See, for example, U.S. Pat. No. 5,520,851 entitled "IRRIDIUM OXIDE FILM FOR ELECTROCHROMIC DEVICE", issued to Yu et al. on May 26, 1996, which is incorporated herein by reference.

The incorporation of such electronics into eyeglasses has produced a new need in the art. Unless all of the electronics, including the electrical signal generating circuit and the power supply, are placed between the hinge and the eyeglass frame, electrical connections between the electronics and the eyeglass lens must be made by traversing the hinge. Electrical connections traversing the hinge could provide only temporary electrical connection between the electronics and the lens which is lost when the frame is closed, or such electrical connections could be provided by sliding wiper contact which is lost momentarily as the wipers slide, or such electrical connections could be permanently connected wires extending between the electronics and the eyeglass lens. For reliability, permanent connection by wires, or electrical conductors, between the electronics and the lens is preferred. Further, since such permanent wired connections require the wired electrical conductors to traverse the hinge, it is preferable that the wires not experience a concentrated bending moment when the eyeglasses are alternately opened and closed because such repeated concentrated bending moments can result in breakage or shearing of the wires or electrical conductors.

Running the wires or electrical conductors past a hinge or pivot point between a temple and the eyeglass frame introduces several problems. If the wires, or conductors, run to the outside of the hinge or pivot point, the wires or conductors are stretched when the temples are closed on the eyeglass frame. If the wires or conductors are on the inside of the hinge or pivot point, the wires or conductors are stretched when the temples are opened away from the eyeglass frames. If the wires or conductors are on the outside of the hinge or pivot point and made long enough to not be under tension when the temples are closed on the eyeglass frame, the wires or conductors are then compressed and could be kinked when the eyeglass frame is opened and the temples pivoted away from the eyeglass frame.

Accordingly, there is a need in the art for a hinge having one or more wires, such as one or more electrical conductors, extending therethrough which overcomes the above-noted problems in the art particularly as experienced in eyeglass frames as set forth above.

Copending and commonly assigned U.S. patent application Ser. No. 09/211,787 discloses a hinge for electrooptic devices which places a torsional stress on conductive wires passing through the hinge.

SUMMARY OF THE INVENTION

The disadvantages associated with the prior art are overcome by the invention of a tang/clevis-type hinge and one or more wires, or electrical conductors, wherein a portion of such wire or wires is run axially through the center of at least one of two separate, axially-aligned, pivot pin portions of said hinge, and through a gap between the opposed ends of said pivot pin portions, thereby causing such wire or wire portions to be placed in torsion upon pivoting movement of the hinge. Thus, the novel tang/clevis-type hinge of this invention is a split pin hinge comprising first and second split pin portions, a tang, a clevis and a wire or connector, wherein a first portion of said split pin is inserted from a first side of said hinge and a second portion of said split pin is inserted from the opposite side into said tang and clevis thereby pivotally connecting said tang and clevis. The opposing ends of the pin portions do not meet when inserted into the hinge, which forms a gap that allows said wire to pass between the opposed ends of the first and second pin portions and into an axial bore in either or both of the pin portions. As such, the split pin assembly eliminates any stretching of the wire(s) upon opening or closing of the hinge. Such a split-pin hinge and wire combination may be utilized as any eyewear hinge and combined advantageously with the other components of a pair of eyeglasses including eyeglass lenses which undergo a change in optical characteristic, such as transmittance, when an electrical signal, or electric charge, is applied to the eyeglass lenses over wires or electrical connectors.

BRIEF DESCRIPTION OF THE DRAWINGS

The teachings of the present invention can be readily understood by considering the following detailed description in conjunction with the accompanying drawings, in which:

Referring now to FIG. 1, there are shown electrooptic eyeglasses 10 embodying the present invention. Eyeglasses 10 include a frame 12 in which a pair of eyeglass lens 14 and 15 are mounted, a nose piece or bridge 16, temples 18 and 19 and hinges 22 and 24 which mount the temples 18 and 19 pivotally to the frame 12. Electrooptic eyeglass lenses 14 and 15, in a preferred embodiment, are electrochromic lenses of the type known to the art which undergo a change in optical characteristic, for example, a change in their transmittance property, upon the application of a suitable electric charge to the electrochromic lens.

Figure 1:
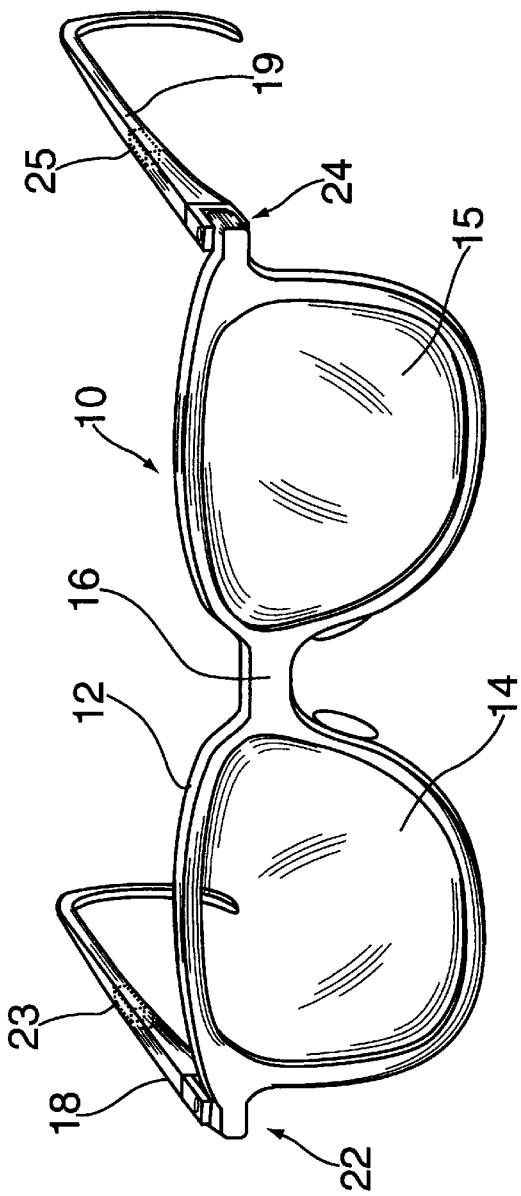
FIG. 1 is a perspective view of a pair of eyeglasses embodying the present invention.

The temples 18 and 19 may have respective electronics, electrical circuits for generating electric charge and power supplies, 23 and 25 mounted suitably internally thereof for respectively applying electric charge to the electrooptic eyeglass lenses 14 and 15 over a pair of wires or electrical conductors not shown in FIG. 1. It will be understood that instead of having two sets of electronics 23 and 25, a single electrical circuit and power supply may be provided in only one of the temples for applying electric charge to only one eyeglass lens and the eyeglass lens 14 and 15 may be electrically interconnected by a suitable connector (not shown) extending across the bridge 16.

Figure 2:
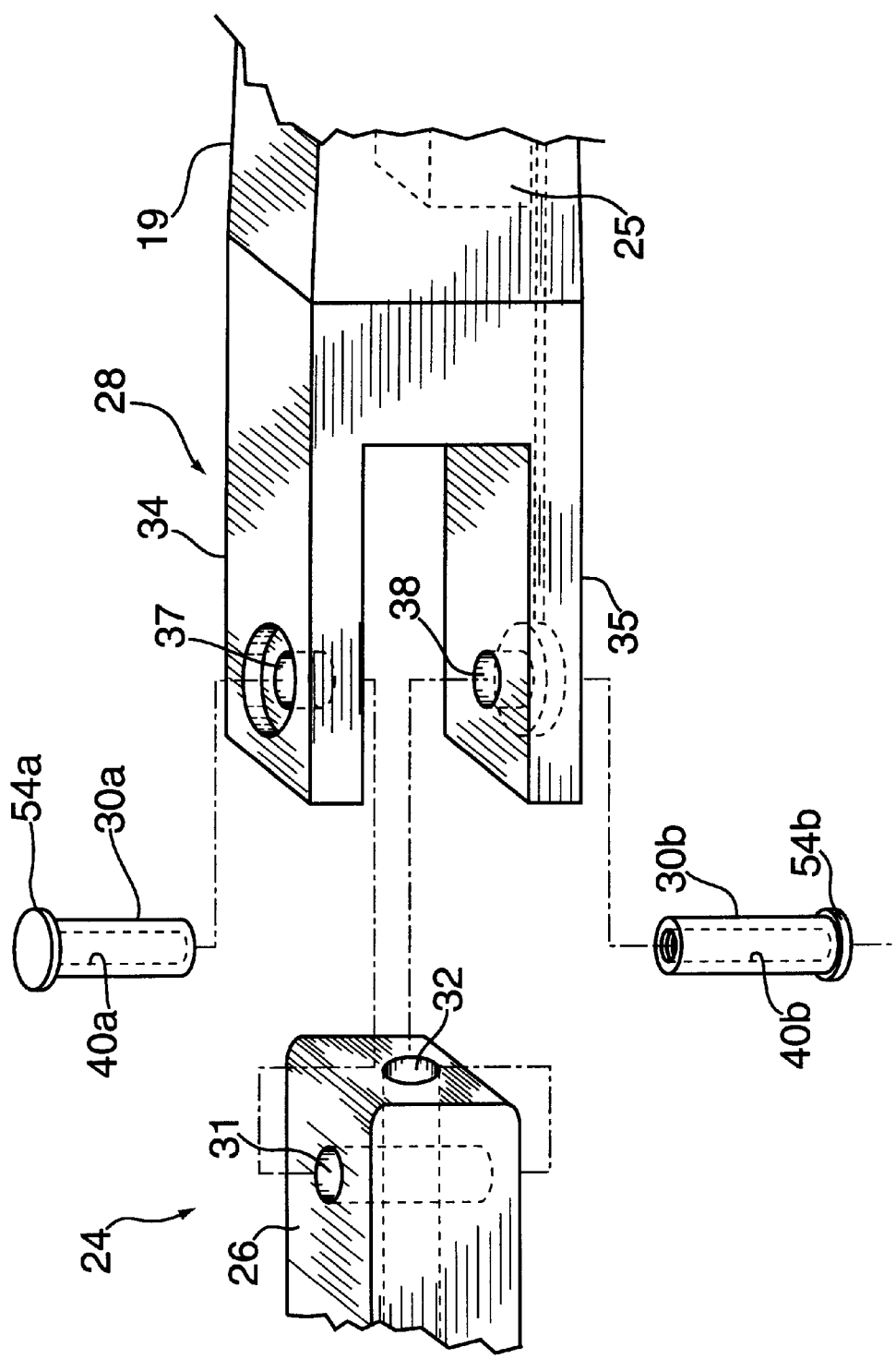
FIG. 2 is an exploded view of a hinge embodying the present invention and including a tang, clevis and first and second split pin portions.
Figure 6:
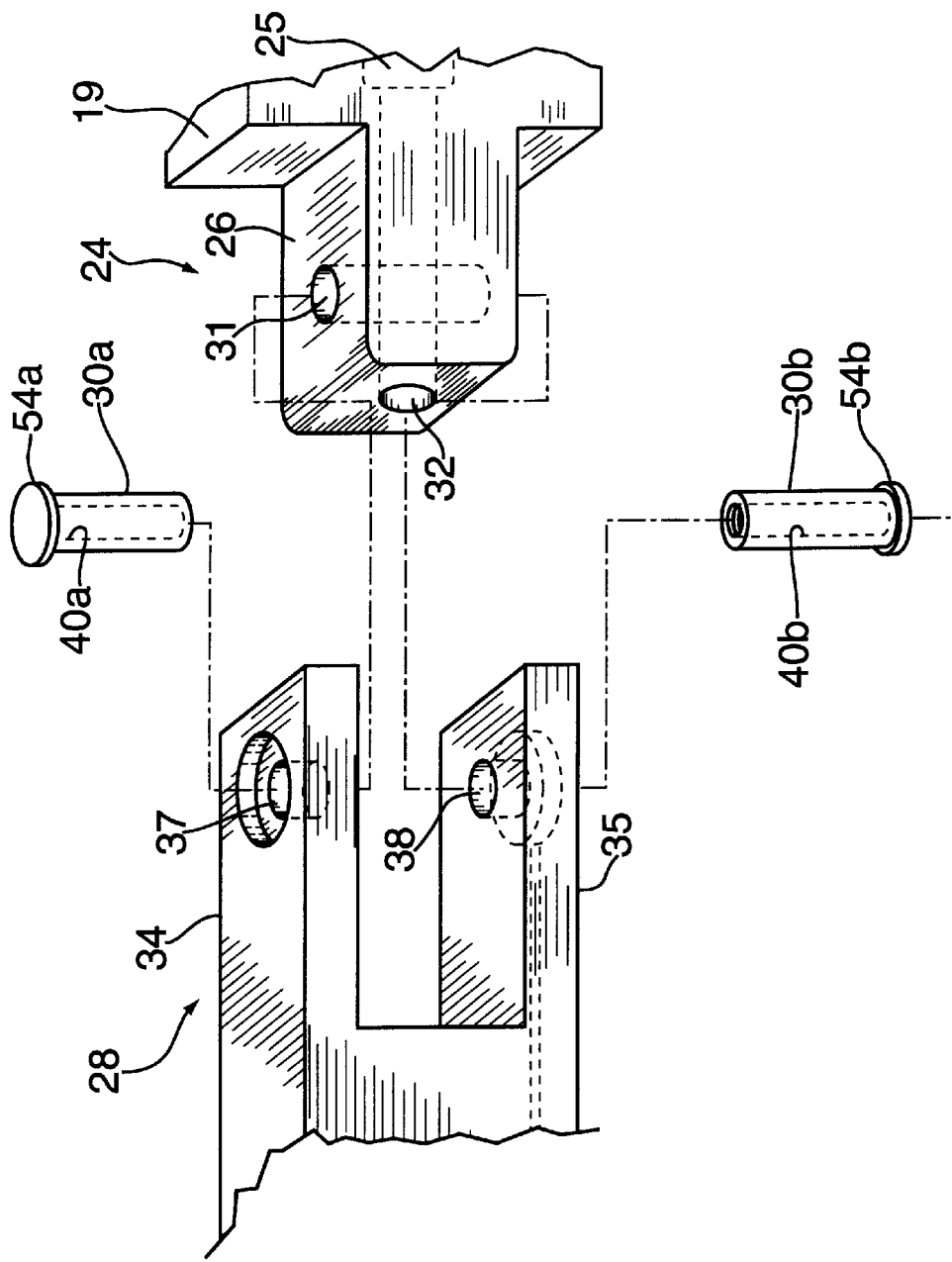
FIG. 6 is an exploded view of an alternative hinge embodiment of the present invention including a tang, clevis and first and second split pin portions.

Referring to FIG. 2, representative hinge 24, embodying the present invention, is shown in exploded view. Hinge 24 may include a tang 26, preferably a tang which is generally rectangular, extending outwardly from the eyeglass frame 12, a generally U-shaped clevis 28 extending outwardly from one end of the temple 19 and separate first and second axially-aligned portions, 30a and 30b of a split cylindrical and longitudinally extending pivot or connector pin. Alternatively, as depicted in FIG. 6, the tang 26 can extend outwardly from a temple and the clevis 28 can extend outwardly from the frame. Furthermore, the tang 26 may have a rounded distal end to facilitate clearance for movement when the tang 26 is coupled to the clevis 28.

The tang 26 is provided with a through hole or bore 31 for receiving pivot or connector pin portions 30a and 30b, and the tang 26 is further provided with a longitudinally extending hole or bore 32 extending through the tang and generally perpendicular to and in communication with the gap 42 (see FIG. 3) between connector pin portions 30a and 30b and hole 31. The clevis 28 includes a pair of spaced apart and substantially parallel clevis members or arms 34 and 35 provided, respectively, with axially aligned pivot or connector pin through holes or bores 37 and 38 for receiving pivot pin portions 30a and 30b.

One or both of the pivot or connector pin portions 30a and 30b are hollow, i.e., either or both are provided with a centrally formed axial bore 40a and 40b extending longitudinally through the pivot pin portions. Pivot pin portions 30a and 30b are operably connected to the instant hinge by any suitable means. For example, the cylinder shaft diameter of first and second pivot pin portions 30a and 30b can be sized so as to provide a contact or pressure fit within clevis through holes 37 and 38 and a clearance or slip fit through tang through hole 31, or vice versa.

Additionally, pin portions 30a and 30b preferably contain radially extending flanges 54a and 54b. Hole 37 in clevis arm 34 is preferably counterbored to accept the head of flange 54a and hole 38 in clevis arm 35 is preferably counterbored to accept flange 54b. When assembled, flanges 54a and 54b preferably rest against the counterbore surfaces of holes 37 and 38, respectively. Appropriate peens may be used to help secure pivot pin portions 30a and 30b in holes 37 and 38, respectively. Thus, when the pivot pin portions 30a and 30b are fit into bores 37, 38 and 31, they may be retained by peen crimps (not shown) in clevis arms 34 and 35.

It will be understood that bore 32, in the preferred embodiment, provides a passageway for receiving a segment or segments of one or more wires or electrical conductors used to connect the electronics 25 provided in the temple 19 with the electrooptic lens 15 mounted in the eyeglass frame 12. It is noteworthy that the wire(s) or connectors) can connect any type of electrical components across the hinge and that direct connection to a lens is not necessary. In a preferred embodiment, axial bores 40a and 40b in either or both of pivot pin portions 30a and 30b, gap 42 formed between the opposing ends of split pin portions 30a and 30b, and bore 32 combine to provide a continuous passageway for various segments of such wires or electrical conductors.

Referring still to FIG. 2, for assembly, the clevis members or arms 34 and 35 are placed over the tang 26 and the pivot or connector pin through hole 31 formed in the tang and the pivot pin through holes 37 and 38 formed respectively in the clevis members 34 and 35 are axially aligned and the pivot pin portions 30a and 30b are inserted through the aligned through holes to hingedly or pivotally interconnect the tang 26 and clevis 28. The opposing ends of pin portions 30a and 30b do not make contact after installation, thereby forming gap 42 which, with bore hole 32 and axial bores 40a and/or 40b, provide a continuous wire passageway. The size of the gap is determined by the relative length of pin portions 30a and 30b and should be sufficient to accommodate all wires or connectors passing therethrough.

Preferably, once the pin portions 30a and 30b are inserted such that the flanges 54a and 54b rest against the counterbore surfaces of bores 37 and 38, peens are struck to fix the pin portions 30a and 30b into the hinge 24. Alternatively, it will be understood that the pivot pin portions 30a and 30b, tang pivot pin through hole 31 and clevis pivot pin through holes 37 and 38 are dimensioned such that the cylinders of split pin portions 30a and 30b are alternatively press-fit into the tang through hole 31 to mount the pivot pin portions 30a and 30b and tang 26 stationarily with respect to each other. Additionally, the cylinders of split pin portions 30a and 30b are alternatively slip-fit into the clevis pivot pin through holes 37 and 38 to permit relative movement between the clevis 28 and the pivot pin portions 30a and 30b, such that pivotal movement is provided between the tang 26 and clevis 28 by the clevis 28 pivoting about the opposed ends of split pin portions 30a and 30b. Alternatively, the pressure and slip-fit sizings can be reversed between the tang and clevis.

Figure 5:
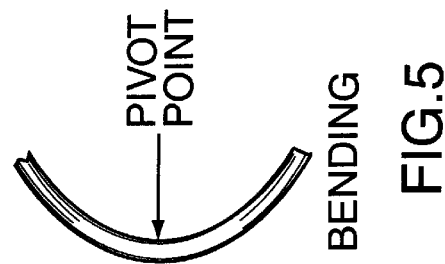
FIG. 5 is a partial diagrammatical view of a wire or conductor experiencing bending about a pivot point.
Figure 4:
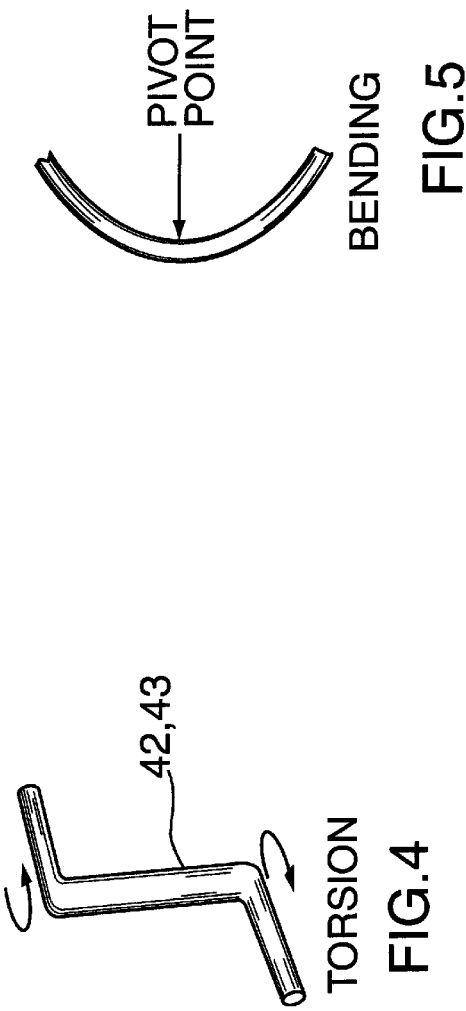
FIG. 4 is a partial diagrammatical view of a wire or electrical conductor experiencing torsion.
Figure 3:
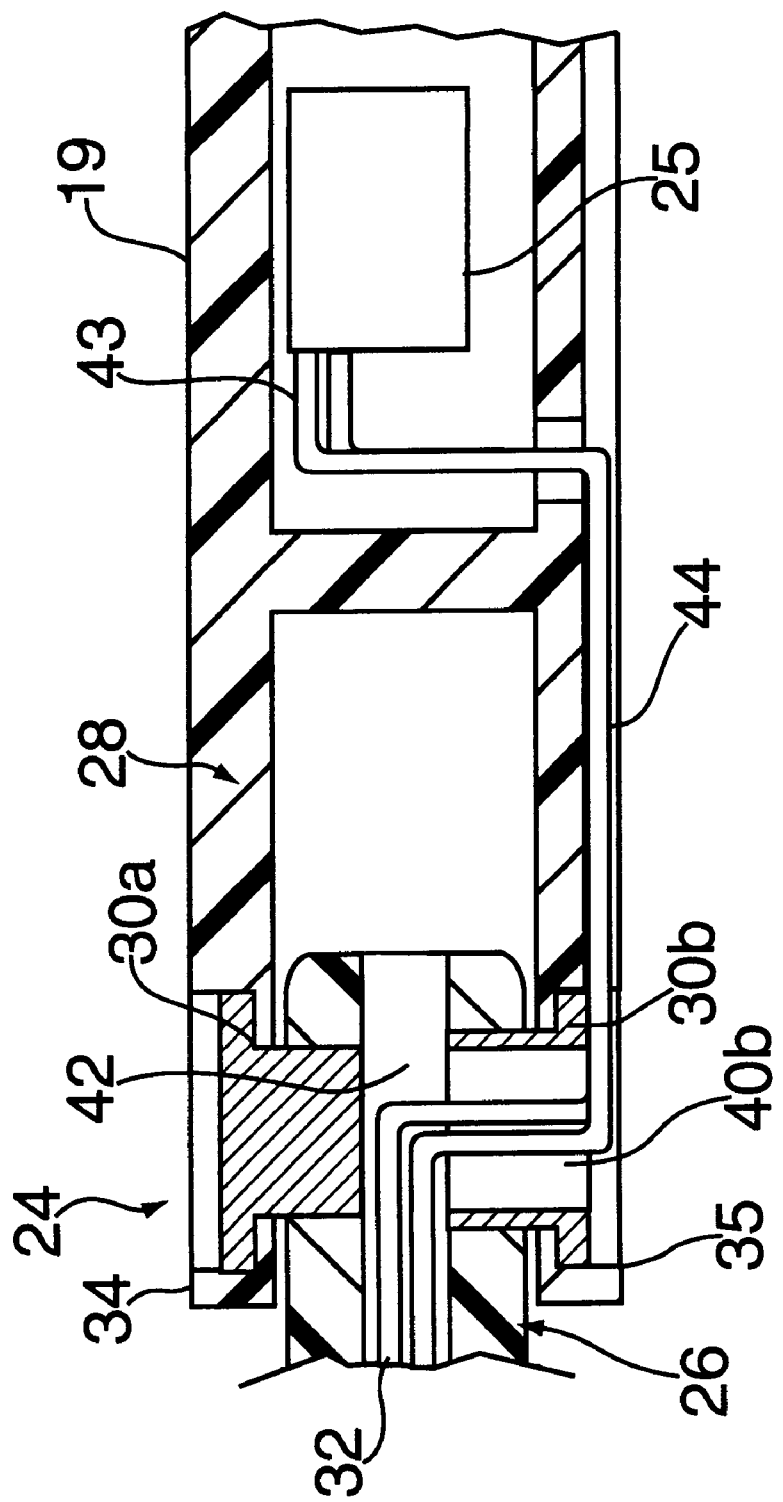
FIG. 3 is an assembled view of the tang, clevis and first and second split pin portions and further showing a pair of wires or electrical connectors extending through a bore in the lower pin portion and the gap between the axially aligned pin portions.

Referring now to FIG. 3, the representative hinge 24 is shown assembled as described above with regard to FIG. 2. It will be noted in FIG. 3 that in the assembled condition, gap 42 formed between pivot pin portions 30a and 30b is opposed and in communication with the longitudinal bore 32 formed in tang 26. The eyeglasses 10 may further include one or a plurality, preferably a pair of wires, or electrical connectors 43 and 44, connecting the electronics, electrical circuit and power supply, 25 to electrooptic eyeglass lens 15. The electronics 25 supplies a suitable electric charge over the wires 43 and 44 to the eyeglass lens 15 to cause the eyeglass lens to undergo a change in transmittance property as noted above. In the preferred embodiment, the wires or electrical conductors 43 and 44 are made of spring temper wire, or alternatively, the electrical conductors may include a suitable metal core surrounded by any suitable layer of insulation, such as a plastic insulation layer. As shown in FIG. 3, the wires or electrical conductors 43 and 44 extend along the outside of the clevis 28, are bent inwardly and are extended into the axial bore 40b provided in split pin portion 30b and are bent and extend outwardly and through gap 42 formed between pivot pin portions 30a and 30b and into and through the longitudinal bore 32 formed in the tang 26 for connection, directly or indirectly, to the electrooptic eyeglass lens 15. Connection to lens 15 may be made by any suitable connection means, for example, by a solder connection to a bus bar applied to lens 15. In a preferred embodiment, the connector pin portions 30a and 30b are mounted stationarily with respect to the tang 26 and the clevis 28 swings or pivots about the remaining segments of connector pin portions 30a and 30b. Accordingly, it will be understood, that the portions of the wires or electrical conductors 43 and 44 residing in the axial bore 40b of connector pin portion 30b are placed in torsion as indicated diagrammatically in FIG. 4 by the oppositely directed circular arrows, and not subjected to bending as indicated diagrammatically in FIG. 5 about a pivot point, during pivoting movement between the tang 26 and clevis 28 provided by the clevis 28 swinging or pivoting about the opposed pivot pin portions 30a and 30b. In the embodiment shown in FIG. 3, a bore is not required through split pin portion 30a. However, such embodiments are contemplated if, for example, additional wires or connectors extend along both clevis arms 34 and 35.

Referring again to FIG. 3, eyeglasses 10 may further include a suitable cover, not shown, residing over the wires or electrical conductors 43 and 44 and the outer end portion of the temple 19 extending toward the eyeglass frame 12.

In brief review, it has been discovered that by running a segment of a wire or connector through the center of at least one hollow pivot pin portion 30b and then through gap 42 between opposed pivot pin portions 30a and 30b of a hinge, such wire segment is placed in torsion upon pivotal hinge movement, which torsion is distributed along the length of such wire segment and such wire segment experiences relatively moderate strain and such strain is not concentrated at a pivot point as would be the case for such wire portion were the wire portion to experience bending during pivoting of the hinge. Additionally, the inventive arrangement permits the wire(s) to be hidden from view at all times.

Lastly, it will be understood that the present hinge and wire invention may be embodied in apparatus or devices other than eyeglasses and the present hinge and wire invention is not limited to eyeglasses. Furthermore, the foregoing embodiment of the invention contains a single tang that couples to a clevis having two arms. Those skilled in the art will realize from the foregoing disclosure that the hinge can alternatively contain multiple tangs and multiple clevis arms, i.e., the hinge could be a barrel-type hinge.

Although various embodiments which incorporate the teachings of the present invention have been shown and described in detail herein, those skilled in the art can readily devise many other varied embodiments that still incorporate these teachings.

What is claimed is:

1. Hinge and wire apparatus comprising at least one wire and a pivotable hinge including opposed, axially aligned, pivot pin portions, at least one of said pivot pin portions having a centrally formed axial bore extending therethrough, wherein a first wire segment extends through the bore of at least one of said pivot pin portions and through a gap between the opposed ends of said pivot pin portions, thereby placing said wire in torsion upon pivoting of said hinge.

2. The hinge and wire apparatus of claim 1 further comprising:
   a tang and clevis having said pivot pin portions pivotally interconnecting said tang and said clevis.

3. The apparatus of claim 2, wherein said tang further comprises a tang wire passageway, wherein a second segment of said wire extends through said tang wire passageway.

4. The apparatus according to claim 3 wherein said gap between said pivot pin portions is generally opposite said tang wire passageway.

5. The apparatus according to claim 3 wherein said pivot pin portions each comprise a generally cylindrical and longitudinally extending body and wherein at least one of said portions contained an axial bore extending longitudinally therethrough and wherein a gap is present between the opposed ends of said pivot pin portions when said portions are fully inverted with said hinge.

6. The apparatus according to claim 5 wherein said tang includes a first pivot pin through hole extending therethrough for receiving said pivot pin portions and a longitudinal bore extending generally longitudinally through said tang and generally perpendicular to and in communication with said pivot pin through hole.

7. The apparatus according to claim 6 wherein said clevis includes a generally U-shaped body including a pair of spaced apart substantially parallel clevis members having, respectively, second and third axially aligned pivot pin through holes extending therethrough for receiving said pivot pin portions, upon said clevis members being placed over said tang and upon said pivot pin through holes being axially aligned said pivot pin portions being inserted through said pivot pin through holes to pivotally interconnect said tang and said clevis.

8. The apparatus of claim 2 further comprising a plurality of tangs and a plurality of devises being pivotally interconnected by a pivot pin.

9. The apparatus of claim 2 wherein the tang has a rounded distal end.

10. The apparatus of claim 2 wherein said pivot pin portions each comprise a first end and a second end, where each of said first ends contains a radially extending flange.

11. Hinge and wire apparatus comprising:

a first hinge member, a second hinge member and first and second pivot pin portions pivotally interconnecting said first hinge member and said second hinge member;

at least one of said pivot pin portions having a first wire passageway extending therethrough and one of said first and second hinge members having a second wire passageway extending therethrough; and at least one wire, a first segment of said wire extending through said first wire passageway, a second segment of said wire extending through a gap between said first and second pivot pin portions and a third segment of said wire extends through said second wire passageway, said wire being placed in torsion upon pivoting movement between said first and said second hinge members about said first and second pin portions.

* * * * *